United States Patent
Karachale et al.

(10) Patent No.: US 10,169,111 B2
(45) Date of Patent: *Jan. 1, 2019

(54) FLEXIBLE ARCHITECTURE FOR NOTIFYING APPLICATIONS OF STATE CHANGES

(71) Applicant: Microsoft Technology Licensing, LLC, Redmond, WA (US)

(72) Inventors: Jan Karachale, Sammamish, WA (US); Jason William Fuller, Bellevue, WA (US); Robert Levy, Virginia Beach, VA (US); Zeke Koch, Seattle, WA (US); Ardan Arac, Seattle, WA (US); Brian Cross, Redmond, WA (US); Ori M. Amiga, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 571 days.

This patent is subject to a terminal disclaimer.

(21) Appl. No.: 14/609,134

(22) Filed: Jan. 29, 2015

(65) Prior Publication Data

US 2015/0150027 A1    May 28, 2015

Related U.S. Application Data

(63) Continuation of application No. 12/624,038, filed on Nov. 23, 2009, which is a continuation of application
(Continued)

(51) Int. Cl.
*G06F 15/16* (2006.01)
*G06F 9/54* (2006.01)
(Continued)

(52) U.S. Cl.
CPC ............ *G06F 9/542* (2013.01); *G06F 9/4401* (2013.01); *G06Q 10/10* (2013.01); *H04L 67/26* (2013.01);
(Continued)

(58) Field of Classification Search
CPC .. G06F 2209/544; G06F 9/4401; G06F 9/542; H04L 67/26; H04L 67/325
See application file for complete search history.

(56) References Cited

U.S. PATENT DOCUMENTS 5,805,886 A    9/1998    Skarbo et al.
6,631,363 B1    10/2003    Brown et al.
(Continued)

OTHER PUBLICATIONS

Lemon, Jonathan, "Kqueue: A Generic and Scalable Event Notification Facility", In Proceedings of the USENIX Annual Technical Conference on FREENIX Track, Jun. 25, 2001, 13 Pages.
(Continued)

*Primary Examiner* — Hitesh Patel

(57) ABSTRACT

A unified mechanism for storing device, application, and service state, as well as a rich notification brokerage architecture includes a notification broker. Clients register with the notification broker to receive notifications for changes to state properties. When a registered state property changes, a notification broker determines which clients to notify of the state change and provides the client with a notification regarding the change. Clients may be notified whenever a state changes, when a state change meets a predetermined condition, or based on a schedule. An application may also be launched in response to a state change. An application programming interface (API) is provided that provides a unified way of accessing state change information across different components within the device.

20 Claims, 5 Drawing Sheets

Related U.S. Application Data

No. 10/873,881, filed on Jun. 22, 2004, now Pat. No. 7,644,376.

(60) Provisional application No. 60/513,723, filed on Oct. 23, 2003.

(51) Int. Cl.
   G06Q 10/10    (2012.01)
   H04L 29/08    (2006.01)
   G06F 9/4401   (2018.01)

(52) U.S. Cl.
   CPC ...... *H04L 67/325* (2013.01); *G06F 2209/544* (2013.01)

(56) References Cited

U.S. PATENT DOCUMENTS

| | | | |
|---|---|---|---|
| 6,922,708 | B1 | 7/2005 | Sedlar |
| 6,925,513 | B1 | 8/2005 | Clark |
| 7,171,671 | B2 | 1/2007 | Snead et al. |
| 7,305,475 | B2 | 12/2007 | Tock |
| 2002/0035649 | A1 | 3/2002 | Korn et al. |
| 2002/0178077 | A1 | 11/2002 | Katz et al. |
| 2002/0194287 | A1 | 12/2002 | Tyra et al. |
| 2004/0109436 | A1 | 6/2004 | Vargas et al. |
| 2004/0243860 | A1 | 12/2004 | Green et al. |
| 2016/0088046 | A1* | 3/2016 | Lamb .................. H04L 67/325 709/219 |
| 2016/0180797 | A1* | 6/2016 | Kamhi .................. G06F 9/542 345/520 |

OTHER PUBLICATIONS

ITC Investigation No. 337-744, captioned: "Certain Mobile Devices, Associated Software, and Components Thereof" Oct. 1, 2015, 5 pages.
ITC Investigation No. 337-744, captioned: "Certain Mobile Devices, Associated Software, and Components Thereof" Oct. 1, 2015, 1 page.
ITC Investigation No. 337-744, captioned: "Certain Mobile Devices, Associated Software, and Components Thereof" Oct. 21, 2015, 2 pages.
ITC Investigation No. 337-744, captioned: "Certain Mobile Devices, Associated Software, and Components Thereof" Oct. 21, 2015, 3 pages.
ITC Investigation No. 337-744, captioned: "Certain Mobile Devices, Associated Software, and Components Thereof" Oct. 21, 2015, 1 page.
ITC Investigation No. 337-744, captioned: "Certain Mobile Devices, Associated Software, and Components Thereof" Docket Report retrieved Oct. 30, 2015.
ITC Investigation No. 337-744, captioned: "Certain Mobile Devices, Associated Software, and Components Thereof" Sep. 2, 2016, 1 page.
ITC Investigation No. 337-744, captioned: "Certain Mobile Devices, Associated Software, and Components Thereof" Docket Report retrieved Sep. 9, 2016.
"Mobile Information Device Profile (JSR-37), Java 2 Platform, Micro Edition, 1.0a", In Book of Mobile Information Device Profile Specification , Published by Sun Microsystems, Dec. 15, 2000, 284 Pages.
"Office Action Issued in European Patent Application No. 04023852. 9", dated Jun. 15, 2018, 9 Pages.
Inouye, et al., "Dynamic Network Reconfiguration Support for Mobile Computers", in MobiCom '97 Proceedings of Ihe 3rd Annual ACM/IEEE international conference on Mobile computing and networking, Sep. 26, 1997, 10 Pages.
"Final Office Action issued in U.S. Appl. No. 10/873,881", dated Oct. 2, 2007, 14 Pages.
"Non Final Office Action issued in U.S. Appl. No. 10/873,881", dated Jun. 30, 2008, 16 Pages.
"Non Final Office Action issued in U.S. Appl. No. 10/873,881", dated Apr. 6, 2007, 16 Pages.
"Final Office Action issued in U.S. Appl. No. 12/624,038", dated Dec. 20, 2012, 29 Pages.
"Final Office Action issued in U.S. Appl. No. 12/624,038", dated Apr. 24, 2013, 8 Pages.
"Non Final Office Action issued in U.S. Appl. No. 12/624,038", dated Jun. 5, 2012, 30 Pages.
Ethier, Sheridan, "Application-Driven Power Management: A Framework for Achieving Fine-Grained Control Over the Power Consumption of Purpose-Specific Mobile Devices", In QNX Software Systems Ltd, 2000, 15 Pages.
Giguere, "Java 2 Micro Edition: The Ultimate Guide to Programming Handheld and Embedded Devices", In Chapter 3, of Book Java 2 Micro Edition: The Ultimate Guide to Programming Handheld and Embedded Devices, Nov. 17, 2000, pp. 51-73.

\* cited by examiner

FLEXIBLE ARCHITECTURE FOR NOTIFYING APPLICATIONS OF STATE CHANGES

RELATED APPLICATIONS

This application is a continuation of application Ser. No. 12/624,038, filed Nov. 23, 2009, which is a continuation of application Ser. No. 10/873,881, filed Jun. 22, 2004, now U.S. Pat. No. 7,644,376, which application claims the benefit of provisional application Ser. No. 60/513,723, filed Oct. 23, 2003, which applications are incorporated herein by reference in their entirety.

COMPUTER PROGRAMMING LISTING APPENDIX

Applicant hereby incorporates by reference the two compact discs submitted herewith. The compact discs replace the program listing previously submitted as pages 15-47. The first compact disc is labeled "Copy 1 of the Computer Program Listing Appendix" and includes a single text file entitled "U.S. application Ser. No. 14/609,134—Program Listing.txt" having a size of 46 Kbytes and date of creation of Oct. 8, 2018. The second compact disc is labeled "Copy 2 of the Computer Program Listing Appendix" and includes a single text file entitled "U.S. application Ser. No. 14/609, 134—Program Listing.txt" having a size of 46 Kbytes and date of creation of Oct. 8, 2018.

BACKGROUND OF THE INVENTION

Today, mobile devices are designed to run a variety of applications and keep a user updated with current information. Some of these devices include personal digital assistants, wireless phones, and email devices. Mobile devices are now capable of connecting to the Internet and other networks thorough various means and thus exchange information over the networks. These mobile devices may update applications and send and receive information, such as emails, attachments to emails, and web page content. Providing all of this functionality requires applications on the mobile device to be notified of various events, such as when a new email is available, when a screen of the device is activated, when a phone call is received, and the like. It is difficult, however, to access all of the different state changes associated with the device.

SUMMARY OF THE INVENTION

Briefly described, the present invention is directed at unifying state and notification architecture across devices.

According to one aspect of the invention, clients register with a notification broker to receive notifications for changes to state properties. When a registered state property changes, a notification broker determines which clients to notify of the state change and provides the client with a notification regarding the change. For example, a client may register to receive notifications regarding changes to battery strength, network connectivity, memory usage, and the like. Whenever one of these registered state properties changes, the notification broker sends the client a notification message.

According to another aspect of the invention, clients may be notified whenever a state changes, when a state change meets a predetermined condition, or based on a schedule.

According to yet another aspect of the invention, an application may be launched in response to a state change or a schedule. For example, a client may register to have an application started when a certain event occurs, such as the mobile device receiving a message directed toward the application to be launched. The application may also be started based on a schedule configured by the client.

According to yet another aspect of the invention, an application programming interface (API) is provided that is directed to providing a unified way of accessing state change information across different components within the device. For example, an application may use the same function call to access state properties set by different components within the device.

According to still yet another aspect of the invention, the registered state properties may persist across device reboots.

DETAILED DESCRIPTION OF THE PREFERRED EMBODIMENT

Briefly described, the present invention is directed to providing a method and system a unified mechanism for storing device, application, and service state, as well as a rich notification brokerage architecture. Generally, clients register with a notification broker to receive notifications when certain state properties change. When a registered state property changes, the notification broker determines which clients to notify of the state change and provides the client with a notification regarding the change. Clients may be notified whenever a state changes, when a state change meets a predetermined condition, or based on a schedule. An application may also be launched in response to a state change or a schedule. An application programming interface (API) is also provided that is directed at providing a unified way of accessing state change information across different components within the device.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on."

The term "state property" refers to a "status" variable registered and stored with the notification system for maintenance and change-notifications.

The term "notification request" refers to a request from a client to be notified of a state change.

The term "notification list" refers to a collection of clients which have registered for state property change notifications.

The term "notification broker" refers to an underlying driver responsible for adding, updating, and removing data from a data store.

The term "state change component" refers to any component which adds, updates, or generally maintains State Properties in the data store.

The term "client" refers to any component which registers for state property change notifications. A client may be a state change component as well as a state change component being a client.

The term "state property identifier" refers to a "friendly" string (name) representation of the State Property. This identifier may be hierarchical and is unique.

The term "conditional notification" refers to a notification that is sent when a state property changes and the new value of the state property meets the condition that was specified in the notification request.

Illustrative Operating Environment

Figure 1:
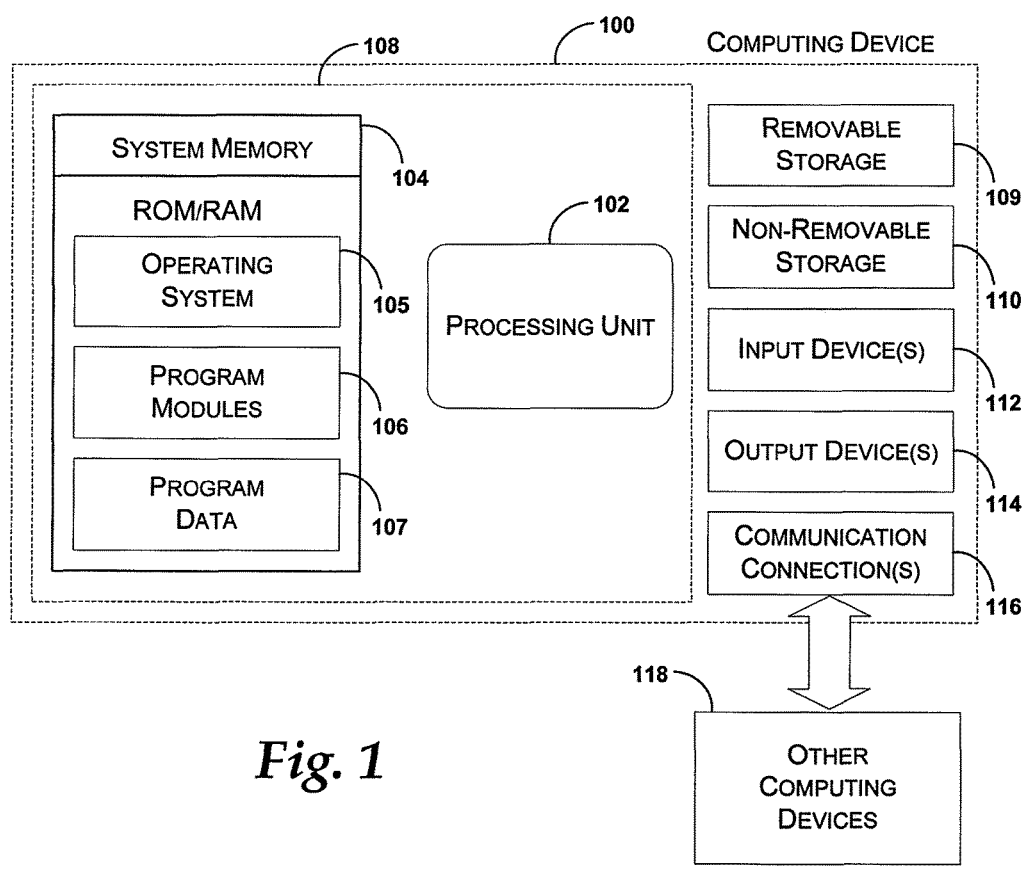
FIG. 1 illustrates an exemplary computing device.

With reference to FIG. 1, an exemplary system for implementing the invention includes a computing device, such as computing device 100. Computing device 100 may be configured as a client or a server. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
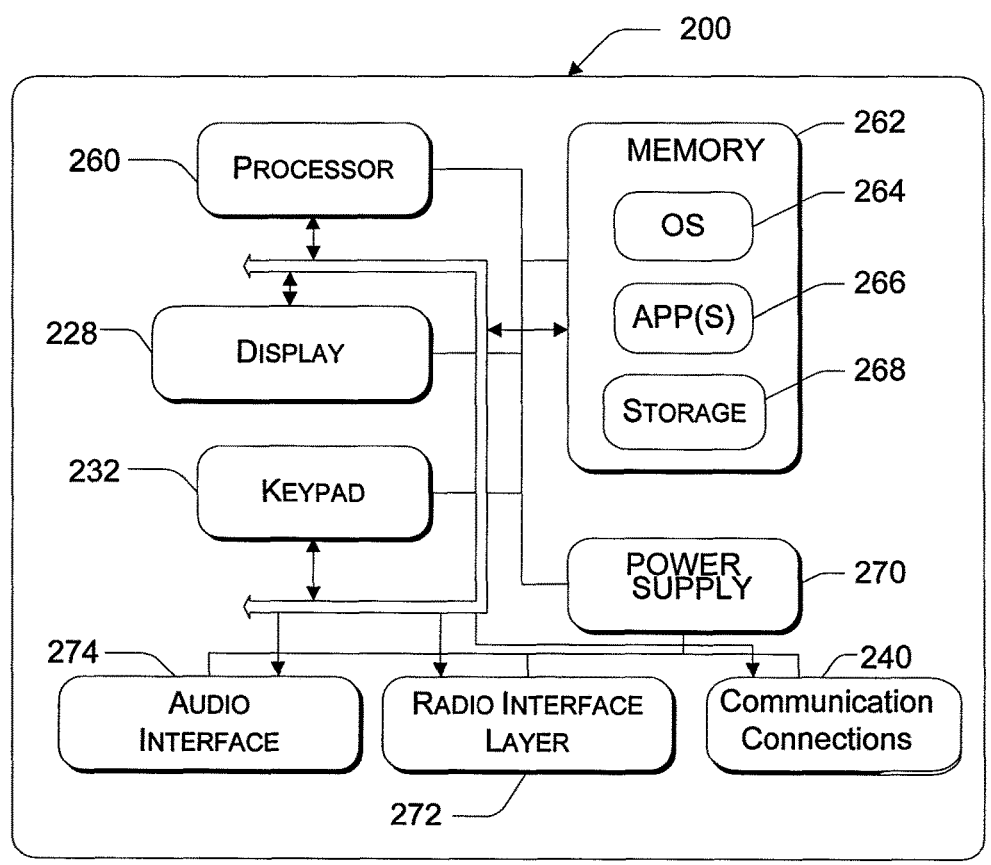
FIG. 2 shows an exemplary mobile device.

With reference to FIG. 2, one exemplary system for implementing the invention includes a mobile device, such as mobile device 200. The mobile device 200 has a processor 260, a memory 262, a display 228, and a keypad 232. The memory 262 generally includes both volatile memory (e.g., RAM) and non-volatile memory (e.g., ROM, Flash Memory, or the like). The mobile device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. Application programs 266 may use a common API to perform actions on state properties associated with the device. For example, a phone dialer program may register with a notification system to receive notifications regarding changes to signal strength, phone state, battery strength, and the like. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing program, and the like.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 may also include external notification mechanisms, such as an LED (not shown) and an audio interface 274. These devices may be directly coupled to the power supply 270 so that when activated, they remain on for a duration dictated by the notification mechanism even though the processor 260 and other components might shut down to conserve battery power. The audio interface 274 is used to provide audible signals to and receive audible signals from the user. For example, the audio interface 274 may be coupled to a speaker for providing audible output and to a microphone for receiving audible input, such as to facilitate a telephone conversation.

Mobile computing device 200 may also contain communication connections 240 that allow the device to communicate with other computing devices, such as over a wireless network. The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 and communication connections 240 may be disseminated to application programs 266 via the operating system 264, and vice versa.

Illustrative State Change Notification System

Figure 3:
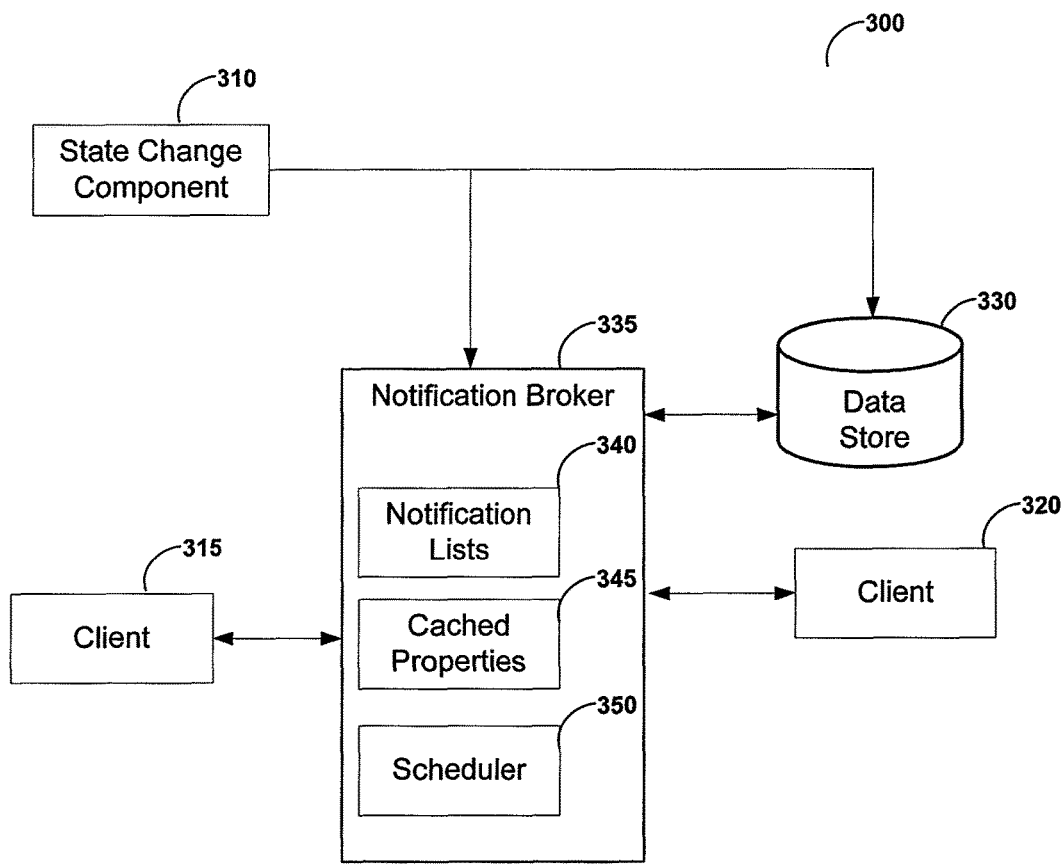
FIG. 3 illustrates an exemplary state management and notification system.

FIG. 3 illustrates an exemplary state management and notification system, in accordance with aspects of the invention. Notification system 300 includes state change component 310, clients 315 and 320, notification broker 335, and data store 330. According to one embodiment, notification broker 335 also maintains notification lists 340, cached properties 345 and scheduler 350.

Clients, such as client 315 or 320, register to receive notifications regarding changes to a state property with notification broker 335. Generally, a client may make a notification request with notification broker 335 that registers the client to receive notifications whenever a state property changes, when the change meets a conditional, or based upon a schedule. The notifications may be permanent or transient notifications.

Permanent notifications are kept in a data store (320). According to one embodiment, the permanent notifications are maintained in a back-end data store, such as the registry, and hence are "persisted" across reboots. As these notifications are persisted, these types of state properties have the same value before a soft-reset (or shutdown) as they do upon a restart (or boot). According to one embodiment, state properties are persistent by default.

Transient notifications are not permanent and are, therefore, not persisted across reboots. In other words, if a device is soft-reset (or rebooted) the notification request is deleted from notification list 340. In order to restore a transient notification, a client re-registers (sends another notification request to broker 335) to receive notifications regarding changes to the state property.

A client may also register to have an application launched upon the occurrence of a state change and/or according to a schedule. Generally, notification broker 335 issues a command to start an application specified by the client if the application is not already running when the state change or the scheduled time occurs. According to one embodiment, the client can specify command-line parameters to be passed into the application when it is launched. If the launched process creates a window then a message is sent to the window indicating the notification. If the target process is already running on the client, then the client simply receives the notification message.

Notifications sent to clients may also be batched. Batched state properties are intended for use by state properties which may undergo frequent value changes. A predetermined period of time is set that allows the state property value to "stabilize." According to one embodiment, the predetermined period is set to 200 ms. If no changes are made to the state property value during the predetermined period, the notification is delivered to the registered clients. The batching predetermined period is configurable and is stored in data store 330.

Data store 330 is configured to store registered state properties, as well as other information. According to one embodiment, data store 330 is the registry provided with an operating system, such as the registry provided with the Windows XP operating system provided by Microsoft Corporation. Data store 330 may also be any other type of data store in which information may be set and accessed. Data store 330 may also comprise one or more data stores maintained at various locations within notification system 300.

Data store 330 may also be pre-loaded with a default set of state property data that may be accessed by clients 315 and 320. Pre-loading the state property data makes many of state properties available without the client having to add a state property. For example, according to one embodiment, the following states are available to clients without registering the state: Display Orientation (Resolution, Brightness); Undismissed reminders (Count, Subject, Date, Time; Location); Undismissed alarms (Count, Description, Date, Time); Battery (% remaining, State); Backup battery (% remaining, State); Memory (Program memory free, Program memory used, Storage memory free, Storage memory used); Storage card (Total memory free, Total memory used); Hardware (Flip-phone state (open/closed), Keyboard enabled, Wifi enabled, Bluetooth enabled, Headphones present, Camera present); Messaging (Unread count, Total count, Drafts count, Outbox count); Tasks (High priority count, Due today count, Overdue count); Calendar (Next appointment, Name, Location, Date, Time, POOM ID); All day appointment (Name, Location, Date, Time, POOM ID); Current appointment (Name, Location, Date Time, POOM ID); Current free/busy status; Instant Messenger (Status, Online contacts count; Offline contacts count); Connectivity (Speed, Wifi, Access point, Signal strength, Connection name, Connects to (work, internet), Status); Media player (Status, Playlist (Name, Mode (repeat, shuffle), Track count, Total duration), Track (Type (audio, video), Name, Album, Artists, Track #, Genre, Year, Duration, Play position, Filename, Bit rate)); Sync status; Telephony (Operator, Signal strength, Phone state, Profile, Roaming, Radio state, Active call (Caller name, Caller number), Missed call count, SIM toolkit message. As can be seen, the states span across many different applications.

According to one embodiment, the state property data is organized into a hierarchy. The hierarchy allows a client to specify a group of state properties by referencing the parent. The state property may be set to a data type, such as string, integer, float, and the like.

The client may identify the state property by a "friendly" string (name) representation of the state property. For example, "battery\a" references the state property "a" under the parent "battery", and likewise there could be a "battery\b" which would be the state property "b" under the same parent. When referring to a group of state properties under a common parent, then the parent identifier may be used. For example to receive notifications based on changes to all of the battery states, then "battery" would be provided in the registration, thereby referencing all of the battery state properties using a single name.

Broker 335 may be configured to control access to setting/adjusting/removing state property types within data store 330. For example, a restriction could be placed on a state property limiting the deletion of the property from the notification system to a predetermined list of clients. When a state property is deleted, clients that have registered for notifications relating to the property are notified of its deletion.

As discussed above, clients 315 and 320 register for the state properties they are interested in receiving notifications about when the state property changes. Clients may register to receive a notification whenever the state they registered changes, when a conditional applied to the state value meets a condition, or upon a predetermined schedule. A conditional notification may be based upon many different conditions.

According to one embodiment, the conditionals include: all, equal, not equal, greater than, greater or equal than, less than or equal, less than, contains, starts with, and ends with. For example, client 315 may register with notification broker 335 to receive a notification when the missed call count state property is Greater than fifteen and when the caller name Contains "Ja." Conditionals allow a client to receive the state change information they are interested in without having to process state change information they do not care about.

The clients registered to receive notifications regarding changes to state properties are maintained in notification lists 340. Notification broker 335 accesses notification lists 340 to determine the clients that should receive notifications when a registered state property has changed.

Scheduler 350 may be configured to notify and/or activate a client based on a schedule. The scheduled activation notification mode allows a client to receive a notification based on a simplified recurring schedule registered with notification broker 335. Schedules may be configured to occur at any interval, such as on the scale of seconds, minutes, hours, days, weeks, or months. According to one embodiment, schedules are defined by the date/time of the first occurrence and the amount of time between occurrences. Additionally, schedules may be defined without a recurrence interval. When no recurrence interval is provided, the notification is only sent once and then the registration is removed from the notifications list. Additionally, when a notification arrives, if the specified application path (provided during the notification request) cannot be found, the scheduled notification registration is removed from the notification list 340.

State change component 310 updates the value of the state property within data store 330 when the state changes. State change component 310 may update the state directly in data store 330 or through notification broker 335. When the state is updated through data store 330, data store 330 communicates the change to notification broker 335. When the state is updated through notification broker 335 then notification broker 335 updates the state in data store 330. In either case, notification broker 335 determines which clients should be notified based on the state change. Notification broker 335 parses notification lists 340 and determines the clients that have registered for notifications regarding the state change. Notification broker 335 applies any conditionals to the value of the state property that has changed and notifies the client when the conditional is met. When there is not a conditional associated with the state change, the client is notified of the state change.

When a client, such as client 315 and client 320, receives a notification from notification broker 335, the client may call a function within a common API (see discussion below) to retrieve the new state of the state property. Alternatively, the property information may be directly delivered to the client along with the notification. When the client is no longer interested in receiving notifications relating to a particular state property, the client may un-register itself from receiving change notifications relating to the state property. Clients 315 and 320 may also directly query broker 335 at any time to find the state of a state property using the common API.

State property values may also be cached by notification broker 335 in cached properties 345. A state property value may be cached for many different reasons. For example, a state property value may be cached such that a previous value of the state property may be compared with a current value of the state property. Additionally, the cache may help to facilitate quick repeated lookups requesting the value of the state property.

According to one embodiment, notification system 300 supports .NET (managed) clients for both additions to the store, as well as change notification registrations.

The following are some exemplary scenarios to further clarify state management notification system 300.

Example 1: ISV Services

Norm the Newbie has built a C# application which keeps a complete database of the current season's Baseball statistics (e.g., teams, players, scores, stats, etc.). He has also built a simple XML web-services client which can connect to a sports website and pull-down updated daily statistics. Since the amount of data the application stores is relatively large, Norm only wants his application to sync data when a "fat pipe" (e.g., 802.1x) is available on the device (e.g., PPC). Norm then registers his application by sending a notification request to notification broker 335 for notifications when a high-bandwidth connection is available. Norm additionally specifies in the notification request to launch his application when the high-bandwidth connection is available. When the state change component associated with the connection updates the state of the connection, notification broker 335 activates Norm's app when the state indicates that it is a high-speed connection.

Example 2: Corporate LOB (Line of Business) Applications

Elph the Enterprise developer has built a field-service form-based VB.Net application for insurance adjuster usage. The application allows an insurance adjuster to look-up part #s and costs, make notes, retrieve car schematics, and the like. Each day, the insurance adjuster takes his mobile computing device out in the field to service customers. The application persists all of its data for today's operation locally in a data store. Elph would like the application to synchronize the offline store with the company's main servers each time the device is cradled. Therefore, Elph registers his application for notifications on synchronization cradle events. Whenever the device is cradled, the application is notified and the application synchronizes its data.

Example 3: Phone Game

Golem the phone game developer is building a next-generation multi-player RPG for a phone. He anticipates the game will be so very popular that it will last for weeks and months at a time. One of Golem's key concerns is the persistence of game state without user intervention. One of the game's neat features is the ability to save current state right before the phone runs out of batteries and ensure the user never loses any data. Golem registers his application to receive low battery notifications to ensure that the game information will be saved before the device runs out of batteries.

Example 4: Device Management Client

Eric the emerging Enterprise Management Client developer is looking to create the next generation mobile computing device and phone management client; able to handle client updates, virus scanning, policy enforcement, and more. Using C# he has built a power device-side client which can handle requests based on server-driven commands. Each night at 3 am, Eric would like his application "woken up" so he can contact the server for updated policies, virus scanner signatures, and the like. In order to achieve this, he simply registers his application with notification broker 335 for a scheduled notification (each day at 3 am). Eric is now assured his app will run at the specified time.

Figure 4:
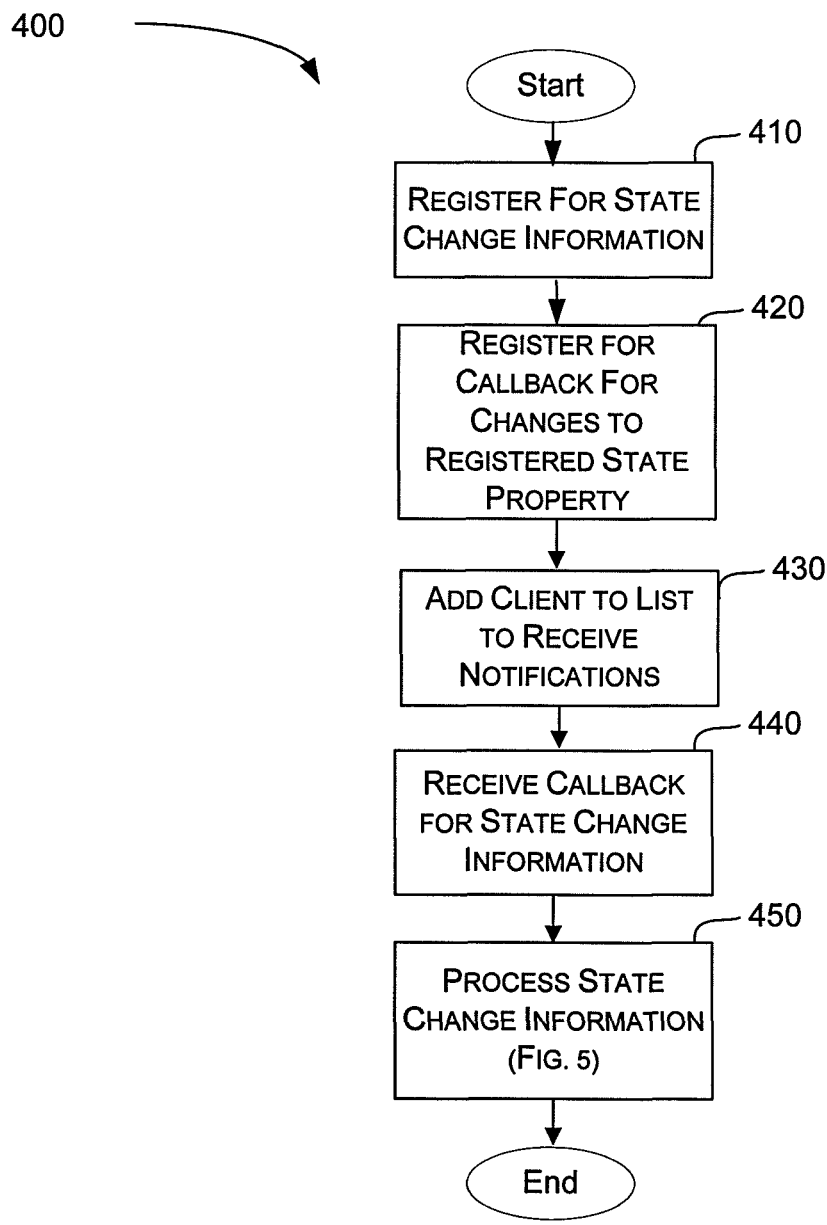
FIG. 4 illustrates a process for a state change notification system.

FIG. 4 illustrates a process for a state change notification system, in accordance with aspects of the invention. After a start block, process 400 flows to block 410, where a client registers to be notified of changes to at least one state property. If the state property is not already being monitored by another client, the state property is added to the list of available state properties. As discussed above, a list of available properties is pre-loaded into the notification system. The client may register to receive notification on all changes made to the property, changes that meet a condition, as well being notified according to a schedule.

Moving to block 420, a callback is registered with the notification system such that when a change is made to a registered state property, the notification system is made aware of the change. According to one embodiment, a notification broker registers a callback with the operating system registry for changes made to the state property value.

Flowing to block, 430, the client is added to a notification list to receive notification messages relating to the state property. Clients included in the notification list receive notifications regarding changes to the registered state property.

Transitioning to block 440, a callback is received when a change is made to any of the registered state properties. According to one embodiment, the callback includes an identifier identifying the state property changes, as well as the current value of the state property.

Moving to block 450, the state change information is processed. Generally, processing the state change information includes determining if any conditionals, schedules, batches, or application launching conditions, apply to each of the registered clients for the changed state property (See FIG. 5 and related discussion).

Figure 5:
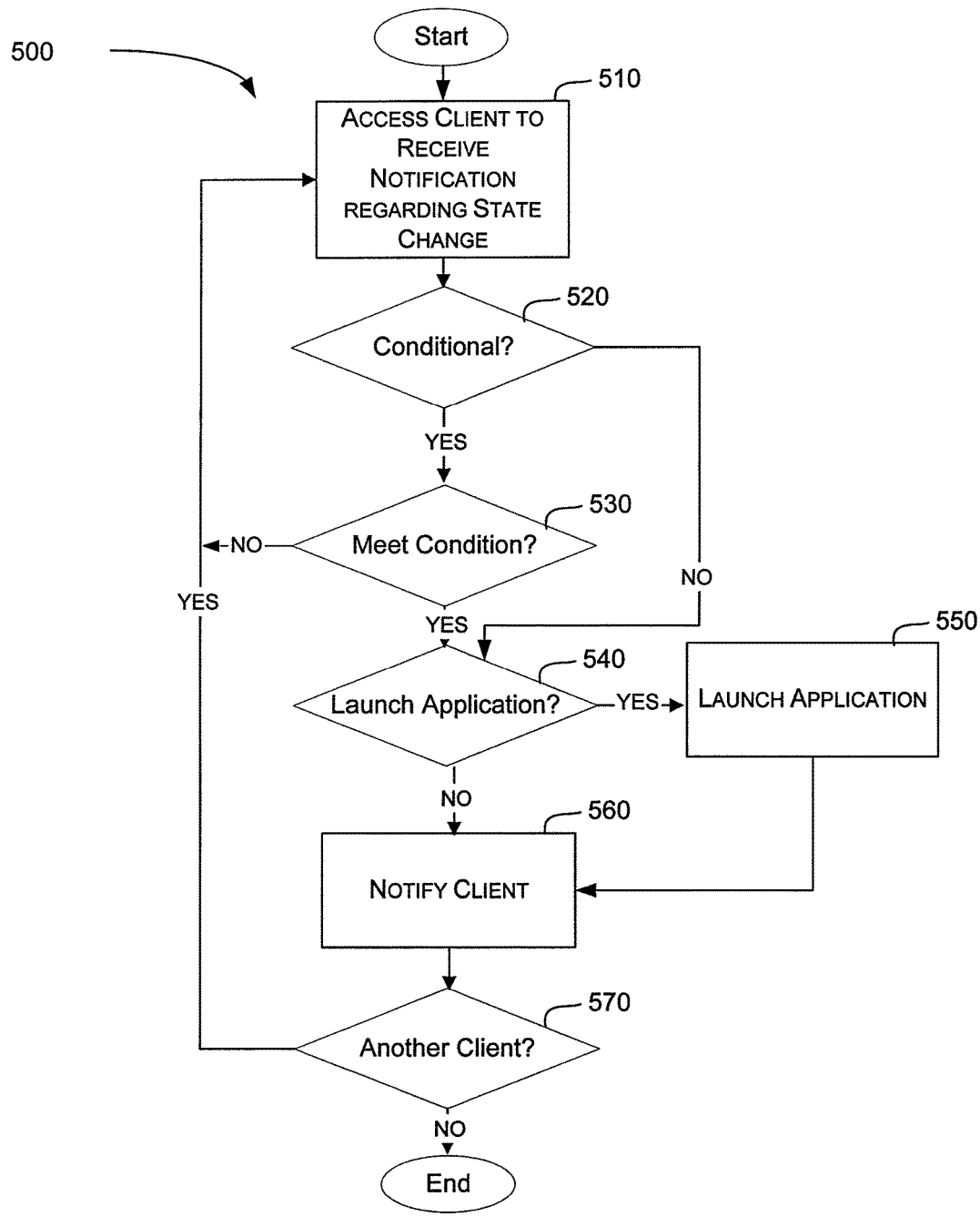
FIG. 5 shows a process for processing state change information, in accordance with aspects of the invention.

FIG. 5 shows a process for processing state change information, in accordance with aspects of the invention. After a start block, process 500 flows to block 510 where a client registered for receiving notifications regarding a state change for the changed state property is accessed. According to one embodiment, a notification list is accessed to determine the registered clients for the state property that has changed.

Moving to decision block 520, a determination is made as to whether the client has specified any conditionals that are to be applied to the state property before notifying the client.

When a conditional expression is associated with the notification request, the process flows to decision block 530 where a determination is made as to whether the condition is met. When the condition is met, or when the client has not specified any conditionals, the process moves to decision block 540, where a determination is made as to whether the client has specified to launch an application in response to a change to the state property. When the client has specified to launch the application, the process moves to block 550 where the application is launched if it is not already running. When the client has not specified to launch the application, or the application has been launched at block 550, the process moves to block 560 where the client is notified of the state change.

The process then flows to decision block 570, where a determination is made as to whether there are more clients registered to receive a notification regarding a change to the state property. When there is another client, the process returns to block 510. When there are no other clients, the process then moves to an end block and returns to processing other actions.

State Property Types and Modes

According to one embodiment of the invention, two APIs may be used to access the state information in the notification system. A native, or underlying API is provided and a managed API is provided to clients. The managed API accesses the native API to perform its operations.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing notifications to clients in response to state property changes, comprising:
  receiving a notification request at an Application Program Interface (API) from a client application on the computing device to receive a notification in response to an event that originates on the computing device; wherein the event is associated with a change in a state property of the computing device; wherein the Application Program Interface (API) is utilized by the client application to register the notification request;
  ensuring that the state property is registered via the API, wherein the API is useable to register for notifications regarding state properties that are updated by different components within the computing device;
  determining when the state property changes, wherein determining when the state property changes comprises using the API to specify a batching operation on changes to the state property that occur within a predetermined time period; wherein a call to the API batching operation specifies a time period for which a value of the state property is to remain constant before notifying the client application of a change to the state property;
  determining when the client should receive notification of the state property change; and
  notifying the client of the state property change on the computing device when determined that the client should receive notification of the state property change;
  wherein the call to the API batching operation reduces a number of instances of notifying the client of the state property change during the time period.

2. The method of claim 1, wherein the notification request made through the API specifies to receive a notification upon an occurrence of at least one of: when a registered state property changes, when a change to the state property meets a conditional expression that is specified through the API, and upon a schedule determined by the client.

3. The method of claim 1, wherein the API also comprises functions for: registering different state properties across different components of the computing device to be monitored for changes by a notification broker; querying each of the state properties to determine a value; and setting the state properties.

4. The method of claim 1, wherein execution of at least a particular portion of the client application on the computing device is dependent upon a received notification.

5. The method of claim 1, wherein the notification request specified through the API comprises indicating when the notification is a permanent notification request and when the notification is a transient notification request; wherein the permanent notification request is stored by the notification broker in a data-store on the computing device that maintains the notification request across a reboot; wherein the transient notification is not maintained across the reboot.

6. The method of claim 1, wherein the API includes functionality for specifying an action of the computing device when a change occurs to a registered state property when the computing device is in a standby mode, wherein the action comprises: ignoring the change, bringing the device out of the standby mode and raising the event when the computing device is taken out of the standby mode by a different event.

7. The method of claim 1, further comprising either launching the client or notifying the client in response to a change to a registered state property.

8. The method of claim 1, further comprising launching the client in response to a schedule defined by the client.

9. The method of claim 1, wherein the state properties are arranged in a hierarchy.

10. A system for state management and notifications, the system comprising:
  a processor;
  a data store on a computing device that is arranged to store information relating to state properties, wherein at least some of the state properties are modified by different components;
  an Application Program Interface (API) configured to perform operations relating to the state properties, and wherein the API is configured to specify a batching operation on changes to the state property that occur within a predetermined time period;
  one or more client applications that are configured to execute using the processor, register notification requests using the API, and receive notifications in response to a change in a state property for which they have registered to receive a notification, wherein the notification requests indicate when the one or more clients should receive notifications in response to changes associated with the state properties, and wherein execution of the client applications is dependent upon a received notification;
  a notification list stored within the data store that is arranged to store the client applications that have been registered to receive notification requests;
  wherein the API exposes to the client applications functionality configured to perform the following actions, including to:
    receive a notification request to add at least one client application to the notification list;
    add the at least one client application to the notification list; and
    determine when a registered state property changes, and when the state property changes, determine the one or more client applications to receive a notification, and notify the determined client applications of the state property change;
  wherein a call to the API batching operation reduces a number of instances of notifying the client of the state property change during the time period.

11. The system of claim 10, wherein the computing device comprises a mobile device.

12. The system of claim 10, wherein the call to the API batching operation specifies a time period for which a value of the state property is to remain constant before notifying a client application of a change to the state property.

13. The system of claim 10, wherein the API includes functions comprising: registering the state properties to be monitored for changes by a notification broker; querying the state properties; setting the state properties; registering notification requests relating to the state properties; launching an application; and comparing the state properties to conditional expressions.

14. The system of claim 10, wherein the change in the state property is responsive to an event that originates on a device executing the client application.

15. The system of claim 10, wherein determining the one or more client applications to receive the notification, comprises: applying a conditional expression specified through the API to the state property before notifying the client of the change to the state property.

16. The system of claim 15, wherein the conditional expression specified through the API comprises the following conditions: all, equal, not equal, greater than, greater or equal than, less than or equal, less than, contains, starts with, and ends with.

17. A method for receiving notifications at a client application in response to state property changes on a computing device, the method comprising:
  at a computing device, transmitting a notification request from a client application via an Application Program Interface (API) to receive a notification in response to an event that originates on the client computing device; wherein the event is associated with a change in a state property of the computing device; wherein the Application Program Interface (API) is utilized by the client application to register the notification request, and state properties are updated by different components within the computing device; and
  based on a determination that one or more of the state properties changes, receiving at the client application a notification of a state property change via the API on the computing device when it is determined that the client application should receive notification of the state property change,
  wherein the determination that the state property changes is performed using the API to specify a batching operation on changes to the state property that occur within a predetermined time period; wherein a call to the API batching operation specifies a time period for which a value of the state property is to remain constant before notifying the client application of a change to the state property, thereby reducing a number of instances of notifying the client of the state property change during the time period.

18. The method of claim 17, wherein the method further includes launching the client application in response to the notification of the state property change.

19. The method of claim 17, wherein execution of at least a particular portion of the client application on the computing device is dependent upon a received notification.

20. The method of claim 17, wherein the change in the state property is responsive to an event that originates on a device executing the client application.

* * * * *